G. F. MALLABY.
RESILIENT TIRE.
APPLICATION FILED SEPT. 27, 1915.
1,214,566.
Patented Feb. 6, 1917.
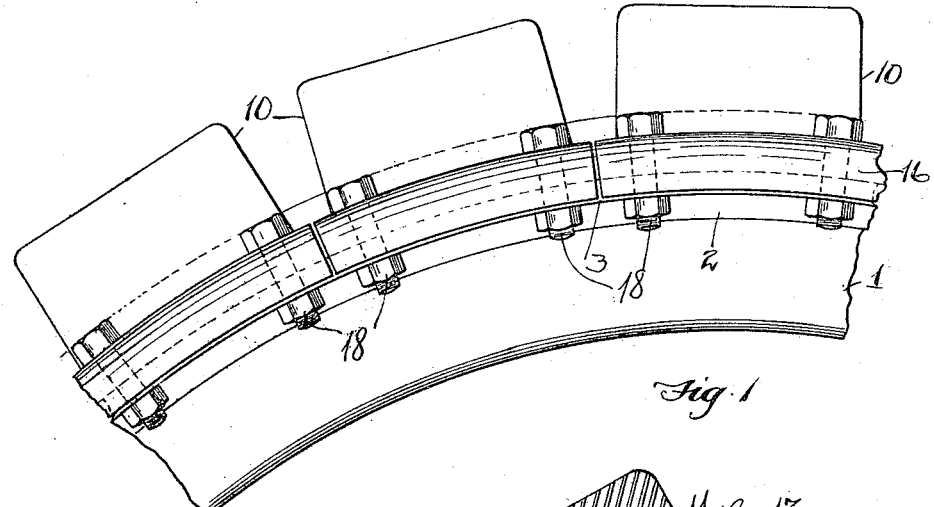
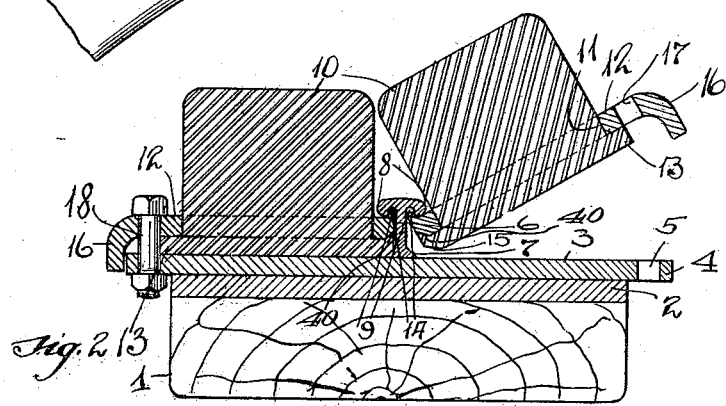

UNITED STATES PATENT OFFICE.

GEORGE F. MALLABY, OF EAST CLEVELAND, OHIO, ASSIGNOR TO KELLY-SPRINGFIELD TIRE COMPANY.

RESILIENT TIRE.

1,214,566.  Specification of Letters Patent.  Patented Feb. 6, 1917.

Application filed September 27, 1915. Serial No. 52,793.

*To all whom it may concern:*

Be it known that I, GEORGE F. MALLABY, a citizen of the United States, and a resident of East Cleveland, county of Cuyahoga, and State of Ohio, have invented a new and useful Improvement in Resilient Tires, of which the following is a specification, the principle of the invention being herein explained and the best mode in which I have contemplated applying that principle, so as to distinguish it from other inventions.

The subject of the present invention is a resilient tire, the particular improvements forming the subject matter of this application relating to a truck wheel of the type which has a plurality of spaced resilient blocks which are attached in some manner to the felly-band of the wheel. In this type of wheel it is desirable to provide means which will make it possible to remove an individual block which has been injured or badly worn, without removing the others, and this is the primary object of the present invention.

For the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing, Figure 1 is a side elevation of a wheel in which is incorporated the present invention; Fig. 2 is a transverse section through such a wheel; and Fig. 3 is a plan view of the rim and blocks.

In Fig. 1 I have shown a vehicle wheel 1, upon which there is mounted the usual felly-band 2, to which is suitably attached an annular base rim or plate 3, this rim being provided with lateral extensions or flanges 4, having at suitable intervals, apertures 5, therein. Upon this rim 3, there is mounted an annular retaining ring or flange 6, which may be removed from the rim 3 when desired, this ring 6, being provided with slanting or tapered surfaces 7 at either side of its base, and with a T-head, of which the two sides constitute flanges 8, provided with circumferentially extending internal grooves 9.

Suitable means for receiving the resilient blocks 10, which are preferably of rubber, are provided, each block 10 being received within a rectangular opening 11, formed in a plate 12, which is adapted to rest flat upon the rim 3, and is suitably curved to lie parallel therewith. The block 10 is provided at its base with a flange 13, which contacts with the under surface of the plate 12, and retains the block in the aperture in such plate. At its inner end the plate 12 is provided with a circumferentially extending rib 14, adapted to engage in the groove 9 formed in the T-head of the ring 6, while the lower edge of the plate 12 is beveled off as shown at 40, to permit the extending flange 13 of the rubber block 10 to be pressed up or squeezed between the tapered surface 7 and the beveled surface 40, when the plate 12 is mounted upon the rim, as indicated at the left in Fig. 2. The rubber block may be formed with a bevel edge 15 conforming to the bevel 7 on the rim 6. When in such position, this plate 12 is parallel with the rim 3, and a depending flange 16 on the outer side of the plate extends over the side of the rim 3, and is provided with apertures 17, registering with the apertures 5, through which registering apertures, bolts 18 are passed to retain the plate in position upon the rim.

An individual plate 12 is provided for each rubber block, although if desired, a single plate may be made of sufficient extent to receive two or more of these blocks. The block is first set into the plate, and the latter is initially positioned upon the rim 3, in the manner shown at the right of Fig. 2, in which position the rib 14 can be inserted beneath the flange 8 of the rim 6, and can thus be forced into the groove 9. The plate 12 is then moved downward until parallel with the rim 6, squeezing up the inner flange on the block 10, between the beveled surfaces 7 and 40 on the ring and plate respectively.

The present wheel is a simple construction in which any single block can be readily removed for replacement, without removing any of the other blocks, and without making it necessary to remove the wheel from the vehicle. It will, of course, be evident that if desired, the retaining ring 6 may be used with a single line of blocks, although it is usual in such wheels to provide a double row of blocks 10, which are usually placed in staggered relation.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a resilient tire, the combination of a base rim, an annular retaining ring mounted thereon and having a flanged portion forming a hook member, a block receiving plate having a rib adapted to engage the hook member to hold the plate from lateral movement when the latter is forced into operative position, and means for securing the plate in operative position on the base rim.

2. In a resilient tire, the combination of a base rim, an annular retaining ring mounted thereon and provided with a beveled base and an upper flanged portion forming a hook member, an apertured plate provided at one edge with a rib adapted to engage said hook member to hold the plate from lateral movement when the latter is forced into operative position, a block secured in said apertured plate and having an edge underlying the same, said underlying edge engaging said beveled base to force the plate into locking engagement with said retaining ring.

3. In a resilient tire, the combination of a base rim, an annular retaining ring mounted thereon and provided with a beveled base and an upper flanged portion forming a hook member, an apertured plate beveled at its inner edge and provided with a rib at said edge adapted to engage said hook member to hold the plate from lateral movement when the latter is forced into operative position, a block secured in said apertured plate and having a flanged portion underlying the same, said underlying portion having a beveled edge to engage the beveled base of said retaining rim to force the plate into locking engagement with the retaining rim.

4. In a resilient tire, the combination of a base rim, an annular retaining ring mounted thereon and having a flanged portion forming a hook member, a block receiving plate having a rib at one edge adapted to engage said hook member and a flange at the opposite edge to overlie the edge of said base rim, and means for securing the plate in operative position on the base rim.

Signed by me, this 24th day of September, 1915.

GEORGE F. MALLABY.

Attested by—
H. B. FAY,
THOMAS H. FAY.

Copies of this patent may be obtained for five cents each, by addressing the "Commissioner of Patents. Washington, D. C."